US010502919B2

(12) United States Patent
Thompson et al.

(10) Patent No.: US 10,502,919 B2
(45) Date of Patent: *Dec. 10, 2019

(54) CABLE ASSEMBLY WITH A REMOVABLE INSTALLATION DEVICE

(71) Applicant: Corning Research & Development Corporation, Corning, NY (US)

(72) Inventors: Zachary M. Thompson, Austin, TX (US); Jonathan V. Haggar, Austin, TX (US); Brian M. Cole, Austin, TX (US); Edward B. Lurie, Round Rock, TX (US); Victor J. Borer, Austin, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,175

(22) Filed: Jun. 18, 2018

(65) Prior Publication Data

US 2018/0299633 A1 Oct. 18, 2018

Related U.S. Application Data

(63) Continuation of application No. 15/452,016, filed on Mar. 7, 2017, now Pat. No. 10,001,619.

(Continued)

(51) Int. Cl.
*G02B 6/44* (2006.01)
*G02B 6/38* (2006.01)

(52) U.S. Cl.
CPC ........ *G02B 6/4465* (2013.01); *G02B 6/3861* (2013.01); *G02B 6/443* (2013.01);
(Continued)

(58) Field of Classification Search
CPC .... G02B 6/443; G02B 6/4494; G02B 6/4433; G02B 6/4471; G02B 6/4429; G02B 6/44
See application file for complete search history.

(56) References Cited

U.S. PATENT DOCUMENTS 3,259,235 A 7/1966 Sowle
4,101,198 A 7/1978 Heldt
(Continued)

FOREIGN PATENT DOCUMENTS

JP 2008187762 8/2008
WO 2005033758 A1 4/2005
(Continued)

OTHER PUBLICATIONS

International Search Report of the International Searching Authority; PCT/IB2017/051341; dated Jun. 2, 2017; 3 Pages, Korean Patent Office.
(Continued)

*Primary Examiner* — Jennifer Doan
(74) *Attorney, Agent, or Firm* — Michael E. Carroll, Jr.

(57) ABSTRACT

A cable assembly is described that includes a preterminated optical fiber drop cable having a connector body mounted on a terminal end thereof, and a removable installation device attached to a jacket of the preterminated optical fiber drop cable by an attachment portion, wherein the attachment portion includes a pair of tear tabs that provides tool-less removal of the installation device from the preterminated optical fiber drop cable.

20 Claims, 9 Drawing Sheets

Related U.S. Application Data (60) Provisional application No. 62/307,974, filed on Mar. 14, 2016.

(52) U.S. Cl.
CPC ......... G02B 6/4466 (2013.01); G02B 6/4471 (2013.01); G02B 6/4476 (2013.01); G02B 6/4495 (2013.01); G02B 6/4497 (2013.01); G02B 6/4433 (2013.01)

(56) References Cited

U.S. PATENT DOCUMENTS

| | | | |
|---|---|---|---|
| 7,035,510 B2 | 4/2006 | Zimmel et al. | |
| 7,147,384 B2 | 12/2006 | Hardcastle et al. | |
| 7,869,685 B2 | 1/2011 | Hendrickson | |
| 8,292,517 B2 | 10/2012 | Allen | |
| 8,718,425 B2 | 5/2014 | Pina | |
| 8,879,883 B2 | 11/2014 | Parikh | |
| 10,001,619 B2 * | 6/2018 | Thompson | G02B 6/4471 |
| 2005/0111811 A1 | 5/2005 | Cooke et al. | |
| 2005/0281510 A1 | 12/2005 | Vo et al. | |
| 2010/0086260 A1 | 4/2010 | Parikh et al. | |
| 2011/0217010 A1 | 9/2011 | Kachmar | |
| 2012/0308184 A1 | 12/2012 | Piña et al. | |
| 2014/0111902 A1 | 4/2014 | Hinz et al. | |
| 2014/0355936 A1 | 12/2014 | Bund | |
| 2016/0116699 A1 | 4/2016 | Larson | |
| 2017/0102507 A1 | 4/2017 | Menguy | |

FOREIGN PATENT DOCUMENTS

| | | |
|---|---|---|
| WO | 2011137236 | 11/2011 |
| WO | 2015081511 | 6/2015 |

OTHER PUBLICATIONS

Extended European Search Report for European Patent Application No. 17765934.9, dated Aug. 21, 2019, 7 pages.

* cited by examiner

CABLE ASSEMBLY WITH A REMOVABLE INSTALLATION DEVICE

CROSS-REFERENCE TO RELATED APPLICATIONS

This application is a continuation of U.S. patent application Ser. No. 15/452,016, filed on Mar. 7, 2017 and subsequently patented as U.S. Pat. No. 10,001,619 on Jun. 19, 2018, which claims the benefit of priority under 35 U.S.C. § 119 of U.S. Provisional Patent Application No. 62/307,974, filed on Mar. 14, 2016, wherein the contents of the foregoing applications and patent are hereby relied upon and incorporated herein by reference in their entireties.

BACKGROUND

Field of the Invention

The present description relates to a drop cable assembly with a removable installation device to facilitate routing a preterminated end of the assembly from an outdoor terminal directly to an indoor wall outlet. In particular, the exemplary drop cable assemblies, described herein, assist with passing a preterminated end of a fiber drop cable through a wall and/or through a conduit in a fiber to the home installation

Background

The deployment of fiber to the home (FTTH) service is occurring at an increasingly rapid pace around the world, as service providers rush to offer greater bandwidth to customers. Installed cost is a significant concern for such service providers. Link loss is the insertion loss of the fiber span between an optical line terminal at a central office and the optical network unit at the subscriber dwelling. Additional connectors or splices are needed at the transition between cable types, and may be necessary when passing from outdoors (i.e. outside of a dwelling) to indoors (i.e. inside of a dwelling). Alternatively, a drop cable can be routed indoors within a conduit for a segment of the length, transitioned to a smaller cable with a splice or connection point, and then routed on the surface of the wall for the remaining segment. Each of these types of terminations adds to link loss, and further adds to the link budget, degrading performance and adding to electronics cost necessary for installation.

Installers often have to drill large holes to pass a connector end of a pre-terminated drop cable through a dwelling wall. Cable penetration solutions have been in existence for a long time. However, as cables evolve, especially fiber optic cables with pre-terminated connectors, the need for more sophistication in the penetration solutions is necessary to enable access without damaging delicate components. Further, conventional cable penetration solutions can require tools to either apply, and/or remove the protective covering from the cable once a penetration has been made. Examples of cable penetration solutions include a push rod and a pull sock, available from companies such as Jonard Tools (Tuckahoe, N.Y.). Each of these solutions have features directed to a particular type of cable installation. A push rod is stiff and has enough beam strength to be held in a cantilever fashion and inserted through a penetration hole and while it can be somewhat flexible (such as a fiberglass rod), push rods are not generally flexible enough to be pulled through a tight conduit with small radius bends. Conversely, a pull sock is generally quite flexible, with the intent of being pulled through tight conduit with a string connected to the pull sock by an eyelet at the front end of the pull sock. Because flexibility in all axes is needed, the pull sock does not have the beam strength required to be pushed through a long narrow opening (i.e. a penetration hole through a wall). The installer may not know what environment they will encounter when installing cables in end user premises.

Additionally, appearance of the installed product inside of the dwelling is a key concern for homeowners and landlords. Poorly routed and stapled cables detract from a property's value. The size of the cable which is exposed to the tenant if surface mounted can detract from the décor of the room. Further, installing fiber to the home is a disruption to the homeowner's space. It is critical for an installer to be able to quickly complete an installation with minimal noise, drilling, dust or other intrusions.

The presently described invention addresses all of the concerns discussed above, limiting link loss and budget, avoiding the necessity of large holes to route a drop cable into a dwelling, providing an aesthetically pleasing solution, and minimizing disruption to a homeowner during installation.

SUMMARY

According to a first embodiment of the present invention, drop cable assembly with a removable installation device to facilitate routing a preterminated end of the assembly from an outdoor terminal directly to an indoor wall outlet is provided. The cable assembly includes a preterminated optical fiber drop cable having a connector body mounted on a terminal end thereof, and a removable installation device attached to a jacket of the preterminated optical fiber drop cable by an attachment portion, wherein the attachment portion includes a pair of tear tabs that allows the tool-less removal of the installation device from the preterminated optical fiber drop cable.

In a second embodiment a cable assembly is described that comprises a preterminated optical fiber drop cable having a connector body mounted on a terminal end thereof, and a removable installation device attached to the preterminated optical fiber drop cable, wherein the installation device is a push-pull device comprising a pulling sock and a pushing device separably attached to a front end of the pulling sock.

In a third embodiment of the a cable assembly, the cable assembly comprises a preterminated optical fiber drop cable having a connector body mounted on a terminal end thereof; and a removable installation device attached a jacket of the preterminated optical fiber drop cable by an attachment portion. The attachment portion includes a sleeve portion and an adhesive portion, wherein the sleeve portion includes two longitudinal slits extending from a first end of the sleeve to a second end of the sleeve to divide the sleeve into two half shell portions to allow tool-less removal of the installation device from the preterminated optical fiber drop cable.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

The terms "buffered" optical fiber and "buffer coated" optical fiber may be used interchangeably throughout the description.

The term "premises" can refer to any building including an apartment building or multi-dwelling unit, a school or college building, an office building, a hotel, a hospital or other location requiring a final service drop to a customer. In addition, the term "living space" is not limited to a domicile or residence, but can include an office, conference room, hotel room, hospital room, school room or other similar room, whether or not continuously occupied. The cable assembly described herein are designed to provide telecommunications service within individual living units, such as residences, classrooms, or offices, within the building.

The present invention is directed to a fiber drop cable assembly with a removable installation device to facilitate routing a preterminated end of the assembly from an outdoor terminal directly to an indoor wall outlet inside the home or other premises. Further, new cable assemblies allow routing and simple tool-less removal of installation tooling and the weather protected outdoor jacket, to expose smaller, subunit or 900 μm fiber only segments that can be routed and attached to the wall until the drop cable reaches the indoor wall outlet.

In particular, the exemplary cable assembly comprises a preterminated jacketed drop cable having an optical fiber connector body disposed at one end and the removable installation device pre-installed over the connector body. In one exemplary aspect, the removable installation device can be a pull sock with pull/tear tab configured for easy removal of the installation device without tools or a ripcord. In another aspect, the removable installation device can be a pull sock having separable push device attached to the nose of the pull sock. In a third aspect, the removable installation device can be protective sleeve disposed over a connector body at the preterminated end of the drop cable assembly, wherein the drop cable jacket has been opened to expose a short unjacketed portion of the drop cable just behind the connector body, which will allow the installer to easily peel off the cable jacket to expose unjacketed portion of the drop cable for routing inside the premises.

Figure 1:
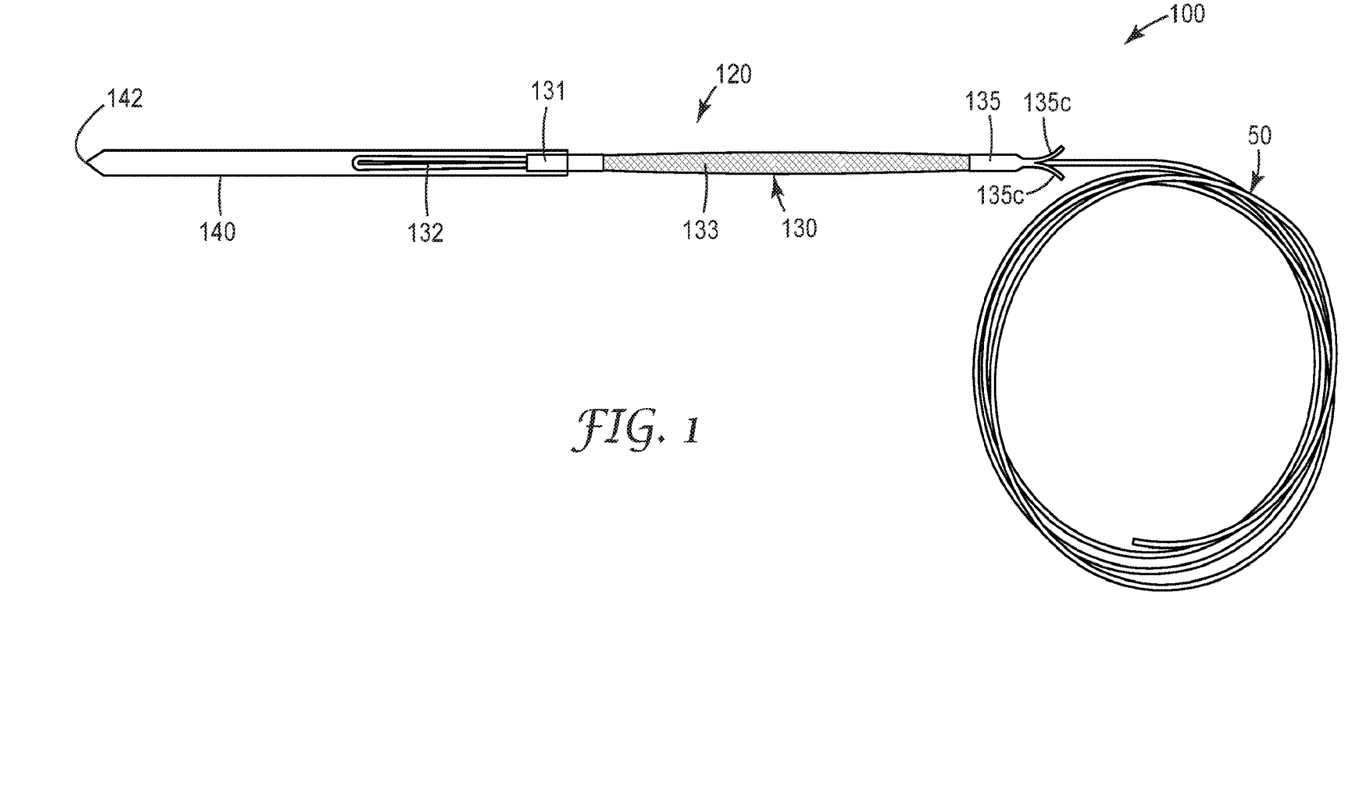
FIG. 1 shows an exemplary fiber drop cable assembly with a removable installation device according to the present invention.

FIG. 1 shows an exemplary fiber drop cable assembly 100 with a removable installation device 120. Drop cable assembly 100 includes a preterminated fiber drop cable 50 having an optical fiber connector body (not shown) disposed at one end, (i.e. first end or the indoor end), wherein the removable installation device is installed over the connector body and attaches to a jacket of fiber drop cable behind the connector body. In one embodiment, the exemplary cable assembly can be an indoor/outdoor cable assembly that runs from the network interface device disposed on an exterior wall of the premises to the wall outlet or optical network terminal inside the premises. In an alternative embodiment, the exemplary cable assembly can be an indoor cable assembly that runs through a conduit from an equipment closet to an end user's living space in an apartment or office building.

In one embodiment, fiber drop cable assembly 100 can be preterminated at one end, the indoor or first end, of the drop cable. In this case, the fiber at the outdoor or second end of the drop cable can be spliced to a network fiber via a splice or field mount connection disposed in a drop terminal or a network interface device.

In an alternative embodiment, both the indoor end and the outdoor end (i.e. the first end and the second end) can be preterminated. In one exemplary aspect, the exemplary cable assembly can accommodate standard format optical fiber connector on both ends of the drop cable, such as SC or LC format connectors. Alternatively, the exemplary cable assembly can have a standard format optical fiber connector on the indoor end and can gave a ruggedized connector mounted on the outdoor end of the drop cable. An exemplary ruggedized connector is described in United States Patent Publication No. 2014/0355936, and U.S. patent application Ser. No. 15/257,034, which is incorporated herein by reference in its entirety.

Figure 2A:
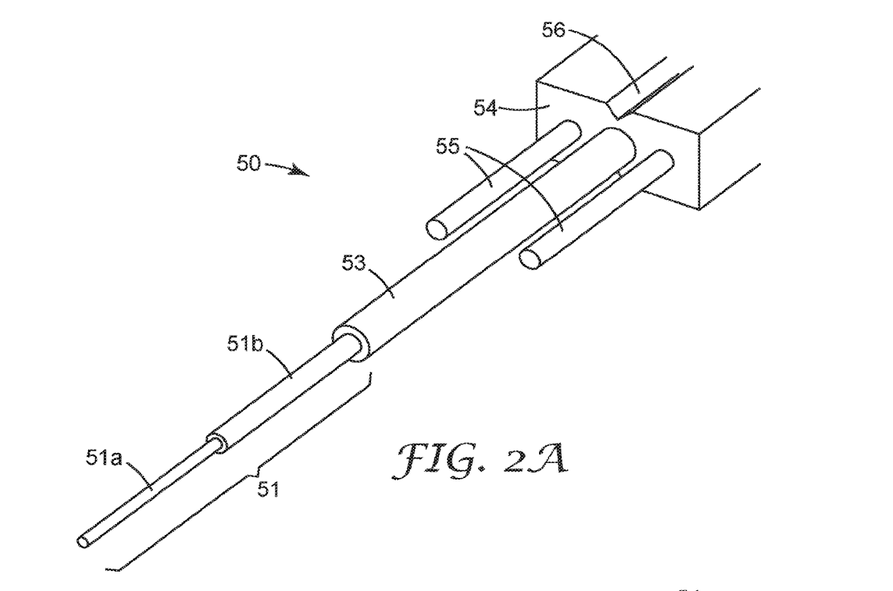
FIGS. 2A and 2B are two views of an exemplary fiber drop cable utilized for the cable assembly of FIG. 1.
Figure 2B:
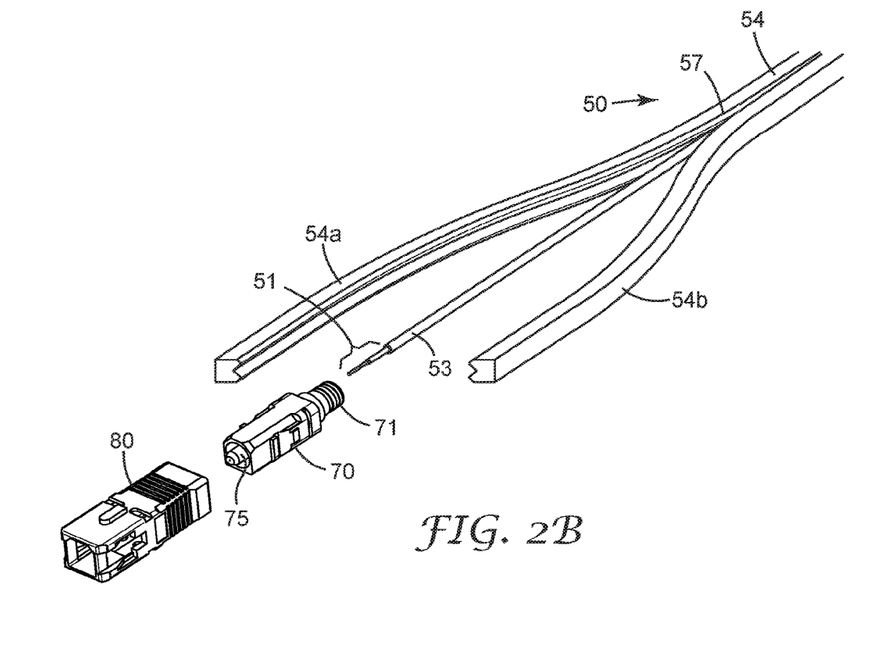

Referring to FIGS. 2A and 2B, fiber drop cable 50 includes an optical fiber 51 surrounded by a buffer layer 53 and a removable jacket 54 formed around the buffer layer. The fiber drop cable may also include two strength members 55 that are positioned within the removable jacket 54 on opposite sides of optical fiber 51. In some embodiments, the strength member 55 may be polymer rods. The polymer rods may be solely polymer, or may be glass reinforced polymer rods, carbon fiber reinforced polymer rods, or polyaramide (e.g., products sold under the trade designation KEVLAR) reinforced polymer rods. Alternatively, fiber drop cable in the drop cable assembly can comprise assembly 100 as described in commonly owned and assigned United States Publication No. 2016-0116699, which is incorporated herein by reference in its entirety.

Optical fiber 51 may be a conventional optical fiber having a conventional diameter of approximately 250 microns. The optical fiber is generally a standard optical fiber with a glass optically transmissive portion 51a having a diameter of approximately 125 microns, and an acrylate coating 51b surrounding the glass, the acrylate coating having a thickness of approximately 62.5 microns, such that the diameter of the entire "optical fiber" is 250 microns. The diameter of the optical fiber surrounded by the buffer layer, which takes into account both the optical fiber and the buffer layer, may in some embodiments be between 250 (nominal) and 700 microns, or between 450 and 550 microns, or potentially between 490 and 510 microns, or between 550 microns and 650 microns, or potentially between 590 and 610 microns. In another embodiment, the diameter of the buffer coated optical fiber may be between 800 and 1000 microns, or between 850 microns and 950 microns, or potentially between 890 and 910 microns. However, although not shown in the figures, in some embodiments, there may be no buffer layer around the optical fiber.

To aid in removing the jacket 54, the jacket may include at least one indentation 56 (or potentially multiple indentations) as illustrated in FIG. 2A. The indentation(s) 56 are positioned proximate the buffer coated optical fiber and run along the cable assembly's axis, allowing for the jacket to be removed more easily and consistently expose the buffer coated optical fiber along its length. Alternatively, the fiber drop cable assembly may include a pull string (not shown) that is positioned within the jacket and runs parallel to the optical fiber. The pull string may be used to open the jacket when pulled by a user.

FIG. 2B clearly illustrates jacket 54 in the process of being removed from the buffer coated optical fiber (fiber 51 and buffer layer 53). The jacket separates at indention 56 into two peeled jacket portions 54a, 54b shown on either side of an exposed buffer coated optical fiber. The jacket can removed by hand or with a tool. In some embodiments, the removable jacket 54 may be formed from a polymer material, such as polyethylene. Other materials may also be suitable materials for the primary jacket, such as polypropylene, polyvinyl chloride (PVC), TPE, neoprene, polyurethane or fluoropolymers such as FEP and PFA. Jacket 54 can, in one preferred embodiment, be both durable and weatherable. As such, one particularly appropriate material for jacket 54 may be UV stabilized polyethylene material. In some embodiments, the jacket 54 may also be abrasion resistant. The jacketed fiber is intended to be ruggedized for potential exposure to the elements, and is often times conspicuously colored black for superior outdoor UV resistance. These properties can create negative visual impact if the jacketed cable is routed with the jacket on into a dwelling. Thus, it is desirable to remove the jacket upon entry into the dwelling. In one embodiment, the jacket may be coated with a low friction fluorochemical coating, such as described in commonly owned and assigned International Publication No. WO 2015/081511, so that it can easily be pulled through the entry point into the dwelling.

Figure 3:
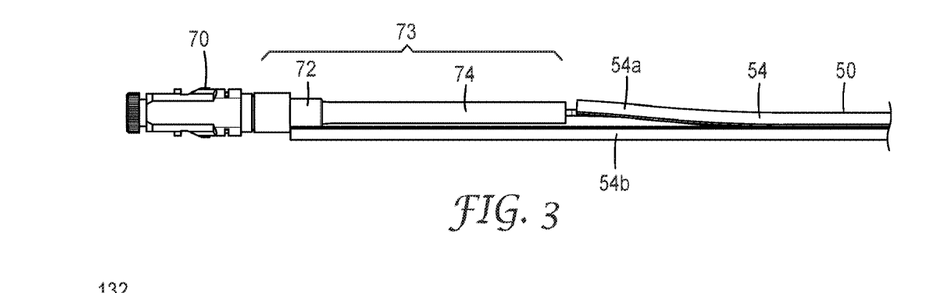
FIG. 3 shows the first end of a preterminated fiber drop cable according to the present invention.

FIG. 3 shows an exemplary connector body 70 mounted on the end of fiber drop cable 50 in the factory. The terminal end of the optical fiber is secured in the connector body by either an adhesive or mechanical means. The connector body 70 when combined with an appropriate outer housing 80 can be a conventional industry standard connector such as an SC APC connector. The outer housing is snapped onto the connector body after the pre-terminated drop cable has been installed. The connector body can belong to connectors such as a SC, ST, FC, or LC format connectors, to name a few, and may be, for example, either a positive contact (PC) or an angled polished connector (APC) type of connector. In one aspect, the exemplary connector body can belong to a standard factory mount epoxy connector. In another aspect, the exemplary connector body can belong to a connector such as, 3M™ No Polish Connector SC Plug, 3M™ Hot Melt LC Connector, and 3M™ CRIMPLOK™ ST SM 126 UM Connector, each of which is available from 3M Company (St. Paul, Minn.).

Figure 4:
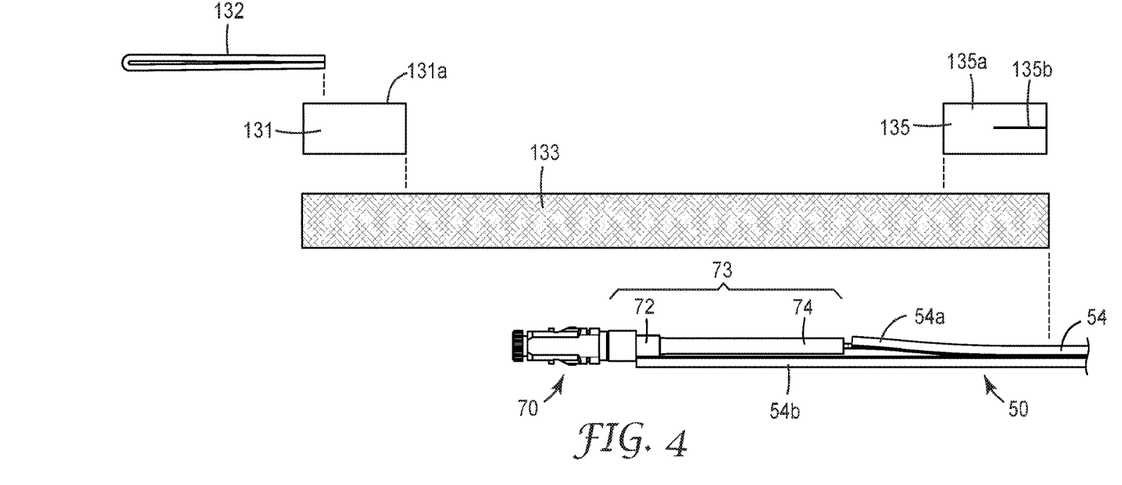
FIG. 4 is a partially exploded view of the parts used to make the cable assembly of FIG. 1.

Removable installation device 120 can be a pulling sock 130 and a separable pushing portion/device 140 attached to a nose portion 131 of the pull sock portion as shown in FIGS. 1 and 4. The pulling sock protects the preterminated end of the fiber drop cable 50 and facilitates pulling the drop cable through conduits, if required. The separable pushing device is a rigid device that facilitates installing the preterminated drop cable through small holes and passages that can accommodate the bend radius of the pushing device.

Pulling sock 130 includes a tubular body 133, a nose portion 131 disposed at one end of the tubular body portion, a flexible pulling loop 132 attached to the tubular body portion by the nose portion, and an attachment portion 135 attached to the other end of the tubular body portion opposite the nose portion. The flexible pulling loop 132 can be formed from a piece of string, cord, yarn, or wire. In an exemplary aspect, the flexible pulling loop can be formed from an aramid yarn. In another aspect, the material used to for the flexible pulling loop can be slipped into a piece of reinforcing tube prior to being attached to the tubular body. In yet another aspect, the flexible loop can be formed from a piece of furcation tubing. The nose portion is formed to extend over a first end of the tubular body on one side, securing the flexible loop to the tubular body.

The tubular body is sized to be larger than the connector body that will be disposed within it to protect the pre-terminated end of the fiber drop cable without exerting any force on the connector body. In an exemplary aspect, the tubular body can be formed from a woven collapsible sleeve.

The attachment portion is configured to attach the pull sock to the cable jacket 54 of the drop cable. In an exemplary aspect, the attachment portion can be slit through along the longitudinal axis of the attachment portion with the slit extending part of the distance between the terminal end of the attachment portion and the end of the tubular body when the pulling sock is secured to the drop cable over the connector body, the slit sections of the attachment portions will become tear tabs 135*c* to facilitate removal of the pull sock from the cable when it is no longer needed. In the exemplary aspect shown in FIG. 5A, two slits were made into the attachment portion before it was installed on the cable forming two tear tabs after the pull sock is attached to the drop cable. In an exemplary aspect, the slits can be between about 12 mm to about 20 mm long. The tear tabs create an initiation point for peeling back the attachment without using a tool.

Because the attachment portion of the removable installation device is attached to the cable jacket of the fiber drop cable, the connector body, which is disposed within the installation device does experience an appreciable tensile loading on the connector body when pushed or pulled during cable installation.

The nose portion 131 and the attachment portion 135 can be formed from a pre-expanded collapsible sleeve. In an exemplary aspect, the pre-expanded collapsible sleeve can be a short length of internally adhesive coated heat shrink tubing, such as 3M™ Heat Shrink EPS 300 available from 3M Company (St. Paul, Minn.).

Pushing device 140 can be in the form of a rigid tube or a rigid rod having a hollow at one end to accommodate the connector body in the first end of the preterminated drop cable. The pushing device, although rigid, is preferably thin walled as to not significantly increase the diameter of the hole to be drilled to allow the passage of the preterminated drop cable into the premises. The pushing device can include a first guiding end 142 to facilitate guiding the pushing device through a small opening or passageway. The pushing device can used to push the connector body through a hole, straight conduit, or straight passage, wherein the hole has a diameter of less than 0.4 inches. Alternatively, the pushing device can used to push the rigid connector body through a hole, straight conduit, or straight passage, wherein the hole is less 20% larger than the connector body. In yet another aspect, a first end of the fiber cable assembly can fit through a ⅜ in. hole or passage.

In an exemplary aspect the pushing device can be, for example, a 5/16 in open or closed rigid tube made of poly(ethylene terephthalate), or glycol modified poly(ethylene terephthalate). The first guiding end can be formed by melting and shaping the end of the plastic tube such that the tube has a radiused first end, a conical first end, or an angled first end. In an alternative aspect, the pushing device can have a flat or blunt first end. The inside diameter of the plastic tube should be sufficient to allow insertion of the nose portion of the pulling sock. In some embodiments, the inside diameter of the plastic tube should be sufficient to allow insertion of the connector body disposed on a terminal end (for example, the indoor end) of the fiber drop cable.

To assemble an exemplary cable assembly, a length of fiber drop cable, for example, a piece of FRP cable of the desired length, is selected. For example the FRP can be cut to a 25 ft. length, a 50 ft. length, a 100 ft. length or any other desired length. The original length of the fiber drop cable may be slightly longer than the final desired length to ensure an adequate amount of cable for the cable termination procedure(s).

A section of the drop cable jacket 54 (FIG. 2A) is removed at the first end or the indoor end of the fiber drop cable by making a small cut in the end of the cable between the opposing indentions 56 on the top and bottom sides of the cable. The cable jacket can then be separated in two halves or peeled jacket portions 54*a*, 54*b* along the indentions longitudinally along the drop cable to expose about 10 cm of the 900 μm tight buffered fiber. Peeled jacket portion 54*a* is cut to 12 mm from the jacket split point 57 shown in FIG. 2B. About 75 mm of the buffer layer 53 is stripped off the terminal end of the exposed tight buffered fiber and then the acrylate coating layer 51*b* is removed to leave a bare glass fiber 51*a*, such that there is 16 mm of bare glass fiber exposed after stripping.

Referring to FIGS. 3 and 4 (shown in the assembled form), the strain relief tube/crimp ring assembly 73 is threaded onto the fiber until it bottoms out against the unsplit cable jacket. The exposed bare glass portion 51*a* (FIGS. 2A and 2B) is then inserted into a standard epoxy filled SC/APC connector body disposed in a load adaptor. The end of the strain relief tube/crimp ring assembly is crimped onto the crimp area 71 of the SC/APC connector body. The connector body with the attached strain relief tube is pushed onto the cable so that the end of the buffer layer 53 bottoms out against the ferrule 75 within the connector body. The connector body and optical fiber can be stabilized through the remaining portions of the connectorization process by taping the strain relief tube 74 to peeled jacket portion 54*b* with a first piece of tape (not shown). Peeled jacket portion 54*b* can be trimmed so that it ends at about the shoulder of the crimp ring. The second peeled portion 54*a* can be trimmed just beyond the end of the strain relief tube 74. The epoxy adhesive in the connector body is then cured using standard conditions known in the art. The terminal end of the optical fiber extending from the ferrule of the connector body can be trimmed and polished using conventional factory finishing techniques. Other optical fiber connectors, such as SC-UPC, or LC, can be utilized.

To assemble the installation device onto the preterminated fiber drop cable (FIG. 4), a pulling sock preform comprises a flexible pulling loop 132 formed from a piece 3.0 mm reinforced furcation tubing where the Kevlar has been exposed at each end and is attached to the tubular body portion by the nose portion formed by collapsing a collapsible sleeve 131*a*, for example, a piece of ⅜ in. 3M™ Heat Shrink EPS 300 available from 3M Company (St. Paul, Minn.). The adhesive within the piece of heat shrink melts and flows around the end of the flexible loop and the exposed Kevlar yarn and the tubular body as it shrinks locking them together. The tubular body 133 can be formed from an approximately 20 cm long piece of ½" dia. pulling sock netting. The connector body and optical fiber can be stabilized by applying a second piece of tape around the crimp and peeled jacket portion 54*b*. Optionally, the first piece of tape can be removed from the strain relief tube and peeled portion 54*b*.

Figure 5A:
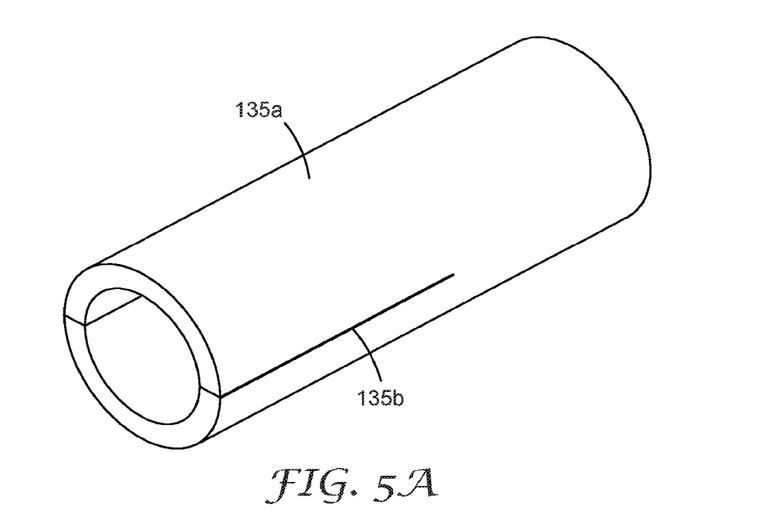
FIGS. 5A and 5B are two views of an attachment portion useful for the exemplary cable assemblies according to the present invention.
Figure 5B:
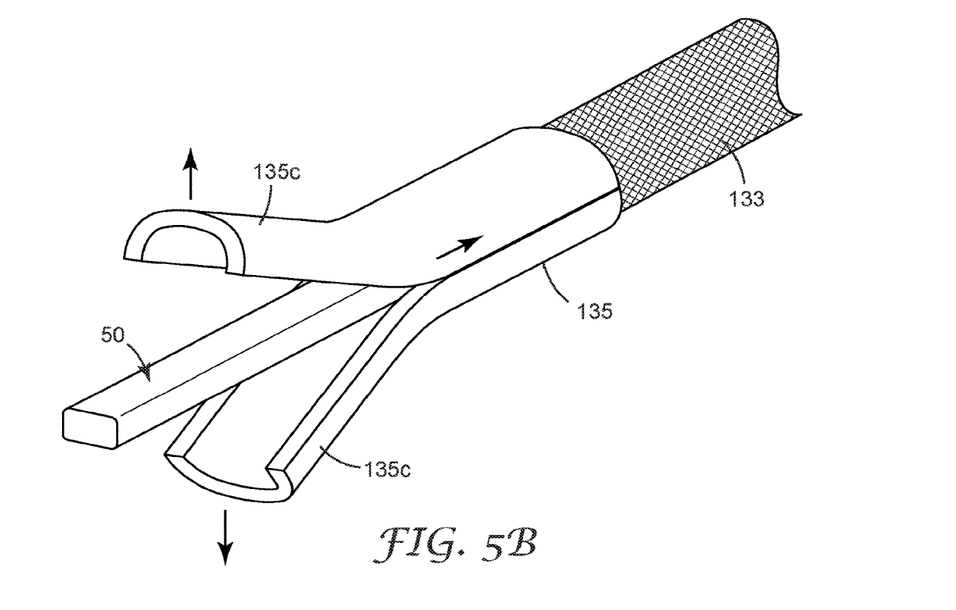

Referring to FIGS. 4, 5A and 5B, the attachment portion will be formed by a second collapsible sleeve 135*a*, for example, a piece of 3M™ Heat Shrink EPS 300 that is between about 1.5 in. and about 2 in. long. Two slits 135*b* are cut on opposite sides at one end to the piece of heat shrink. The attachment portion of the heat shrink is threaded into the tubular sleeve such that the slits in the heat shrink are oriented toward the open end of the tubular sleeve. The connector body 70 of the preterminated fiber drop cable 50 is inserted into the open end of the tubular sleeve until the connector body is in the middle of the tubular body. The tubular body is longitudinally aligned with the preterminated fiber drop cable. While maintaining the alignment, the heat shrink for the attachment portion is slid to down over the open end of the tubular body, such that an unslit portion on the heat shrink material is disposed over the end of the tubular body and the jacket 54 of the fiber drop cable adjacent to the end of the tubular body. Heat is applied and the heat shrink tubing for the attachment portion is shrunk onto the tubular sleeve and the optimal fiber drop cable and simultaneously forming the tear tabs 135*c* (that will facilitate removal of the pulling sock). Using a Slice Precision Cutter or equivalent, the heat shrink material of the attachment portion is cut through on both sides starting from the end of the slit that formed the pull tabs all of the way to the end of the tube disposed on the tubular body, creating a tear propagation path along each side of the attachment portion which allows the attachment portion to be peeled away from the cable jacket. The adhesive from the heat shrink material will ensure that everything continues to be held in place.

The flexible loop 132 can be threaded into a pushing device 140, and the pushing device can be pushed onto the nose portion 131 of pulling sock 130 until it is secured in place as shown in FIG. 1. An outer housing for the connector body can be attached to the exemplary cable assembly, e.g. by a twist tie, for later installation onto the connector body after the preterminated fiber drop cable is installed at the customer premises. The exemplary cable assembly 100 can be coiled and bagged for shipment to the customer.

Optionally, a second optical fiber connector can be mounted on the second or outdoor end of the fiber drop cable. A section of the drop cable jacket 54 (FIG. 2A) is removed at the first end or the indoor end of the fiber drop cable by making a small cut in the end of the cable between the opposing indentions 56 on the top and bottom sides of the cable. The cable jacket can then be separated in two halves or peeled jacket portions 54*a*, 54*b* along the indentions longitudinally along the drop cable to expose about 30 cm of the 900 μm tight buffered fiber. The peeled jacket portions are removed leaving about 1 in. still attached the fiber drop cable. A 3.0 mm furcation tube is slid over the 900 μm tight buffered fiber so that the furcation tube to overlap with FRP rods by a little bit placing the two Kevlar yarn bundles on either side of the FRP cable. A piece of ¼ in. 3M™ Heat Shrink EPS 300 can be slid over furcation joint, aligned with the FRP cable and collapsed. A piece of ¼ in. non adhesive heat shrink material such as 3M™ Heat Shrink FP-301 is then slid the furcation joint such that extends over the furcation tube, the first piece of heat shrink and a the end of the jacketed portion of the fiber drop cable and collapsed.

The 900 μm tight buffer is cut 30 mm (1³⁄₁₆ in.) from end of furcation tube. The buffer layer and the acrylate coating layer 51*b* are removed to leave about 16 mm of exposed bare glass fiber. A standard SC/APC epoxy connector is attached onto the prepared second end of the fiber drop cable using a conventional process.

In another embodiment, the exemplary removable installation device can be a pushing device attached to the indoor end of the fiber drop cable by an attachment portion that includes a pair of tear tabs that enables the tool-less removal of the pushing device from the preterminated fiber drop cable.

In an alternative embodiment, the exemplary removable installation device can be a simple pulling sock 130 as described above with respect to FIG. 1 that is attached to the indoor end of the fiber drop cable 50 by an attachment portion 135 that includes a pair of tear tabs 135*c* that enables the tool-less removal of the pushing device from the preterminated fiber drop cable.

Figures 6A, 6B:
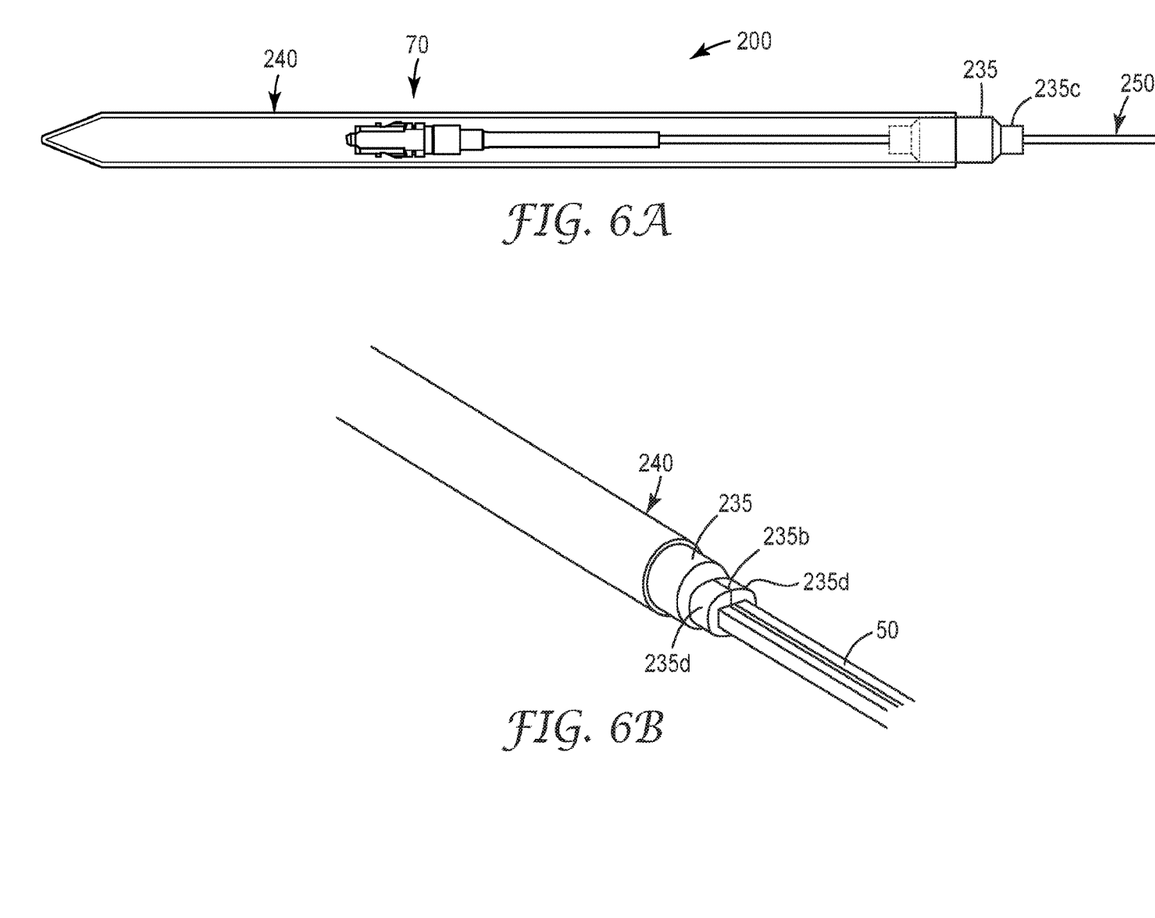
FIGS. 6A and 6B are two views of an alternative fiber drop cable assembly with a removable installation device according to the present invention.
Figure 7:
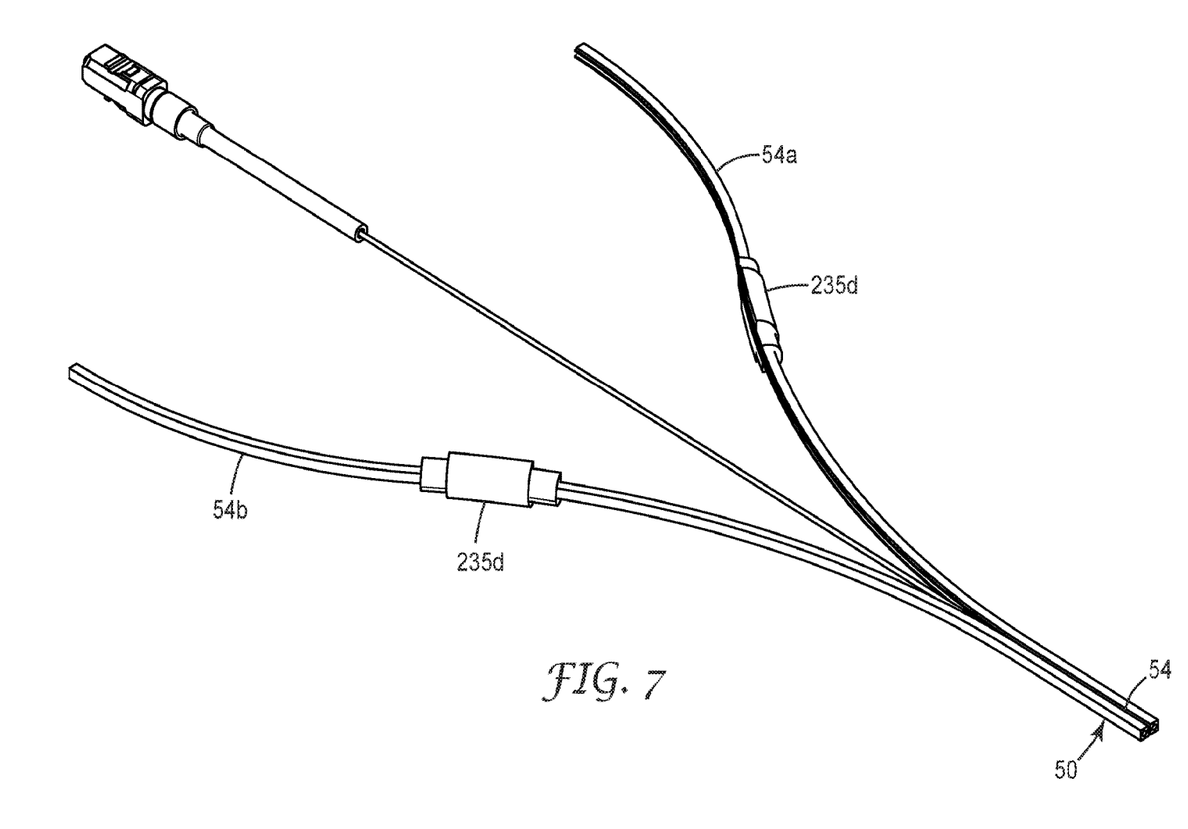
FIG. 7 shows the peeling of the jacket of a fiber drop cable of the cable assembly of FIGS. 6A and 6B.

In a third embodiment of the cable assembly as shown in FIGS. 6A, 6B and 7, cable assembly 200 has a preterminated optical fiber drop cable 50 having a connector body 70 mounted on a terminal end thereof; and a removable installation device attached a jacket of the preterminated optical fiber drop cable by an attachment portion 235, wherein the exemplary removable installation device is a pushing device 240 as described above with respect to pushing device 140 shown in FIG. 1. The attachment portion includes a sleeve portion and an adhesive portion, wherein the sleeve portion has two longitudinal slits 235*b* extending from a first end of the sleeve to a second end of the sleeve to divide the sleeve into two half shell portions 235*d* to allow tool-less removal of the installation device from the preterminated optical fiber drop cable.

The preterminated fiber drop cable is prepared as provided above. Next, the attachment portion is applied onto fiber drop cable 50. A piece of ¼ in. 3M™ Heat Shrink EPS 300 can be slid over a furcation joint, aligned with the FRP cable and collapsed. A piece of ¼ in. non adhesive heat shrink material such as 3M™ Heat Shrink FP-301 is then slid in the furcation joint such that it extends over the furcation tube, the first piece of heat shrink and the end of the jacketed portion of the fiber drop cable and collapsed.

The attachment portion can be formed from a buildup of one more collapsible tubes until it has the desired diameter, which can be slightly greater than or equal to the interior diameter of the exemplary pushing device 240. For example, a first piece of adhesive coated heat shrink can be collapsed onto the cable jacket of the fiber drop cable at the desired position behind the connector body 70. A second longer piece of a heat shrink sleeve can be centered over the first piece of heat shrink and then collapsed. This process can be repeated with successively longer pieces of heat shrink material until the desired size is reached. Using a Slice Precision Cutter or equivalent, the attachment portion is longitudinally slit through on both sides along the length of the attachment to make a tear propagation path.

Once the fiber drop cable 50 has been routed into the house, pushing device 240 is removed from an end of the fiber drop cable and the fiber jacket 54 is removed to facilitate routing the drop cable inside of the customer premises or house. The installer grasps peeled portions 54*a*, 54*b* and pulls them apart exposing the buffer coated optical fiber which is then routed to the desired final location. In this embodiment, the attachment portion splits along the tear propagation path formed by the two longitudinal slits through attachment portion 235 (i.e. such that one half shell portion 235*d* is attached to peeled jacket portion 54*a* and the second half shell portion is attached peeled jacket portion 54*b* as shown in FIG. 7).

Figure 8:
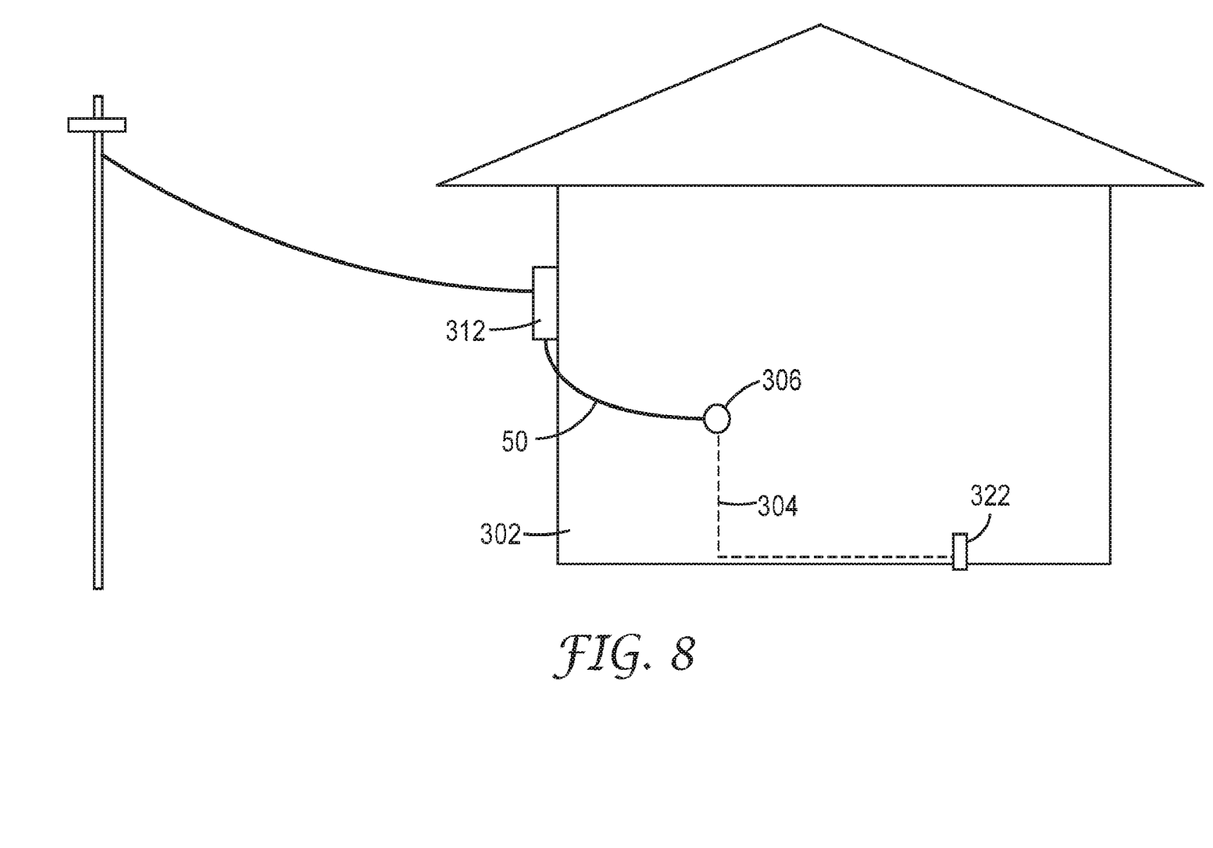
FIG. 8 illustrates an exemplary application for drop cable assembly of the present description.

FIG. 8 illustrates an exemplary application for drop cable assembly of the present description. A house is shown having a terminal 312 positioned on an external wall 302. In one aspect, terminal 312 can be a network interface device. A fiber drop cable 50 is routed from the terminal 312 to an entrance point 306. The drop cable 50 is jacketed and weatherproofed and is routed to an entrance point 306 through which the fiber passes into the interior of the house. Alternatively, the fiber drop cable assembly may be attached to the exterior wall of the house using a number of conventional means, including stapling, cable clamps, or can be routed within a conduit.

Drop cable 50 may need to enter a building, attic, stairwell or multi-dwelling, or may need to be routed underground. For these installations, it may be pulled through a conduit—hard metal tubing or flexible micro duct.

An entrance point 306 may be made by drilling a small hole or passage through an exterior wall of the house. A cable assembly 100, 200 outfitted with a rigid pushing device (140, 240) tube is pushed through the entrance point 306 to the inside of the house 302 (see FIG. 9C). After the pushing device enters the house 302, it is pulled from inside the living space. The pushing device can then be removed from the end of the cable assembly and the pulling sock 130, if present and no longer needed, can be removed by grasping and peeling the tear tabs 135*c* of the attachment portion to separate the pulling sock from the drop cable 50. Removing the jacket of the fiber drop cable exposes the buffered optical fiber (shown as fiber 304 in FIG. 8), which can be routed within the interior of the living space between the entrance point and an outlet 322 by either attaching it to a mounting surface via an adhesive or by using placing the buffered optical fiber in a trach attached to a mounting surface as described in commonly owned United States Patent Publication No. 2016-0116699, herein incorporated by reference.

Figure 9A:
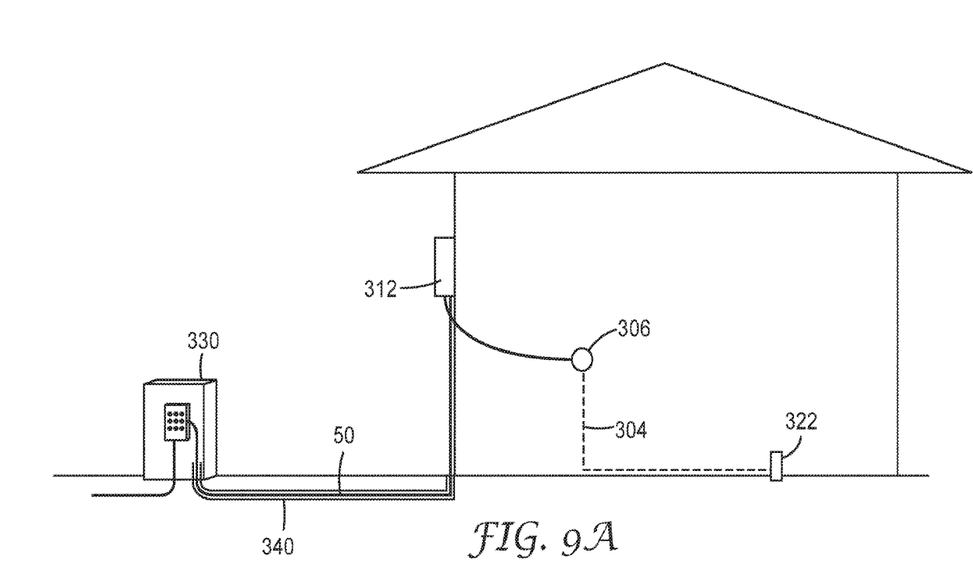
FIGS. 9A-9C illustrate an alternative exemplary application for drop cable assembly of the present description.
Figure 9B:
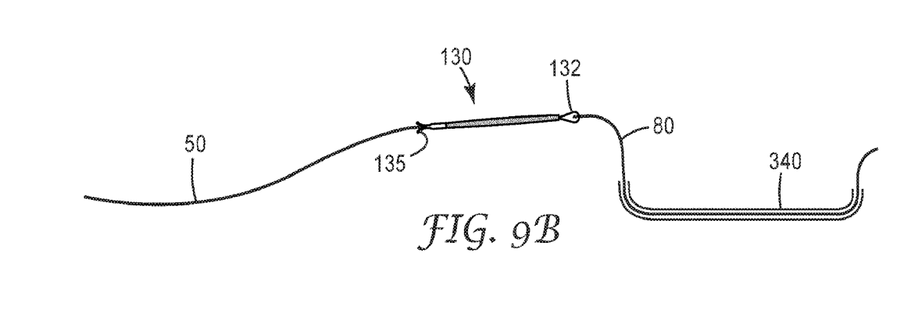
Figure 9C:
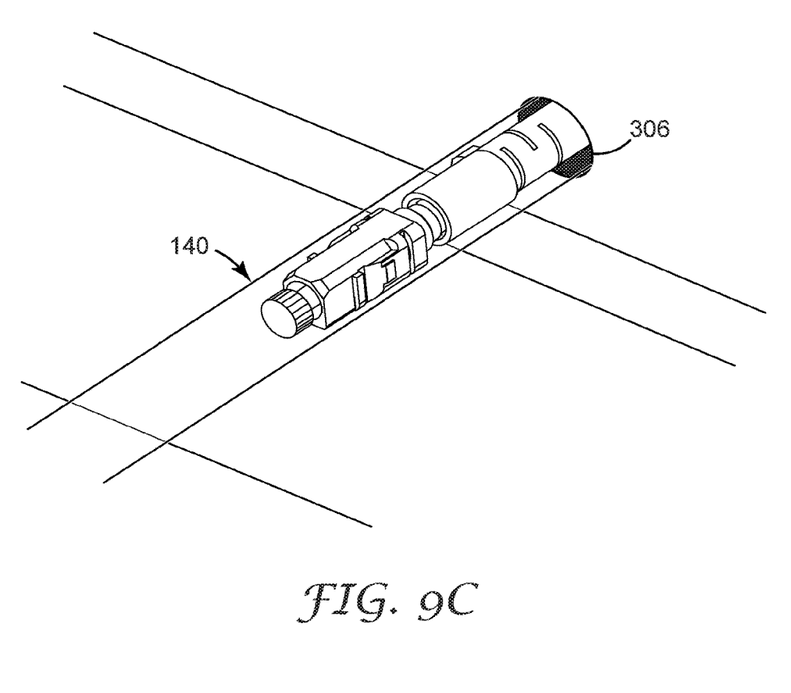

FIGS. 9A-9C illustrates another an exemplary application for drop cable assembly 100. The pushing device can be removed from the nose of the pulling sock and the pulling sock can be used to install fiber drop cable 50 from distribution terminal 330 to remote terminal 312 through a conduit 340. Alternatively, though not shown, the cable may be routed directly from the building entrance point 306 underground through a conduit and routed directly to terminal 330.

A pull string 80 can be run through conduit 340 and can be tied to the flexible pulling loop 132 at the first end of the conduit. The pull string is pulled from the second end of the conduit until the drop cable emerges from second end of the conduit. The drop cable can then be routed to terminal box 312 (if present) for slack storage and cable strain relief and the routed to the entrance point 306 into the house.

Entrance point 306 may be made by drilling a small hole or passage through an exterior wall of the house. Pushing device 140 can be installed on the nose portion of the pulling sock. The pushing device 140 is pushed through the entrance point 306 to the inside of the house (see FIG. 9C). After the pushing device enters the house 302, it is pulled from inside the living space. The pushing device can then be removed from the end of the cable assembly and the pulling sock 130 can be removed by grasping and peeling the tear tabs 135*c* of the attachment portion to separate the pulling sock from the drop cable 50. Removing the jacket of the fiber drop cable exposes the buffered optical fiber (shown as fiber 304 in FIG. 9A) which can be routed within the interior of the living space as described above.

Advantageously, the exemplary fiber cable assembly can facilitate routing the first end of the preterminated fiber drop cable through a very small space. For example, the exemplary fiber cable assembly can guided through a hole, conduit, or passage, wherein the hole has a diameter of less than 0.4 inches. Alternatively, the exemplary fiber cable assembly can guided through a hole, conduit, or passage, that is less 20% larger than the connector body.

Various modifications, equivalent processes, as well as numerous structures to which the present invention may be applicable will be readily apparent to those of skill in the art to which the present invention is directed upon review of the present specification.

What is claimed is:

1. A cable assembly, comprising:
   a preterminated optical fiber drop cable having a connector body mounted on a terminal end thereof; and
   a removable installation device attached to a jacket of the preterminated optical fiber drop cable by an attachment portion, wherein the attachment portion includes at least one tear tab configured to be pulled by a user to facilitate tool-less removal of the installation device from the preterminated optical fiber drop cable.

2. The cable assembly of claim 1, wherein the connector body is disposed within the installation device such that the installation device does not exert any tensile loading on the connector body when pushed or pulled.

3. The cable assembly of claim 1, wherein the installation device comprises a push-pull device comprising a pulling sock and a pushing device separably attached to a front end of the pulling sock.

4. The cable assembly of claim 1, wherein the installation device comprises a pushing device.

5. The cable assembly of claim 1, wherein the installation device comprises a pushing device that includes a rigid tube configured to push the connector body through a straight passage, wherein the straight passage has a diameter of less than 0.4 inches.

6. The cable assembly of claim 1, wherein the installation device comprises a pushing device that includes a rigid tube configured to push the connector body through a straight passage, wherein the straight passage is less than 20% larger than the connector body.

7. The cable assembly of claim 1, wherein a first end of the cable assembly can fit through a ⅜ inch hole.

8. The cable assembly of claim 1, wherein the installation device comprises a protection device disposed over the connector body at the terminal end of the preterminated optical fiber drop cable to protect an exposed, unjacketed portion of the preterminated optical fiber drop cable adjacent to a back end of the connector body.

9. The cable assembly of claim 1, wherein the attachment portion comprises a pre-expanded collapsible sleeve with at least one longitudinal slit.

10. The cable assembly of claim 9, wherein the pre-expanded collapsible sleeve comprises a piece of adhesive-coated heat shrink tubing.

11. A cable assembly, comprising:
    a preterminated optical fiber drop cable having a connector body mounted on a terminal end thereof; and
    a removable installation device attached to a jacket of the preterminated optical fiber drop cable by an attachment portion, wherein the attachment portion includes a sleeve portion and an adhesive portion, wherein the sleeve portion includes at least one longitudinal slit extending from a first end of the sleeve portion to a second end of the sleeve portion to provide tool-less removal of the installation device from the preterminated optical fiber drop cable.

12. The cable assembly of claim 11, wherein the installation device comprises a push-pull device comprising a pulling sock and a pushing device separably attached to a front end of the pulling sock.

13. The cable assembly of claim 11, wherein the installation device comprises a pushing device.

14. The cable assembly of claim 11, wherein the installation device comprises a protection device disposed over the connector body at the terminal end of the preterminated optical fiber drop cable to protect an exposed, unjacketed portion of the preterminated optical fiber drop cable adjacent to a back end of the connector body.

15. A method for installing a fiber optic cable assembly, the method comprising:
  routing a first end of a cable assembly from an exterior location through a building entrance point into an interior location of a building, wherein the first end of the cable assembly includes (i) a preterminated optical fiber drop cable having a connector body mounted on a terminal end of the preterminated optical fiber drop cable, and (ii) an installation device attached to a jacket of the preterminated optical fiber drop cable by an attachment portion; and
  toollessly removing the installation device from the preterminated optical fiber drop cable within the interior location of the building.

16. The method of claim 15, wherein the connector body is disposed within the installation device such that the installation device does not exert any tensile loading on the connector body when pushed or pulled.

17. The method of claim 15, wherein the installation device comprises a push-pull device comprising a pulling sock and a pushing device separably attached to a front end of the pulling sock.

18. The method of claim 15, wherein the installation device comprises a pushing device.

19. The method of claim 15, wherein the installation device comprises a pushing device that includes a rigid tube, and the routing of the first end of the cable assembly includes pushing the connector body with the rigid tube through a straight passage, wherein the straight passage is characterized by one of the following features (a) or (b): (a) the straight passage has a diameter of less than 0.4 inches, or (b) the straight passage has a diameter less than 20% larger than the connector body.

20. The method of claim 15, wherein:
  the attachment portion includes at least one tear tab; and
  the toollessly removing of the installation device from the preterminated optical fiber drop cable comprises pulling the at least one tear tab.

* * * * *